(12) United States Patent
Kiiski

(10) Patent No.: US 6,356,604 B1
(45) Date of Patent: Mar. 12, 2002

(54) RECEIVING METHOD, AND RECEIVER

(75) Inventor: Matti Kiiski, Oulunsalo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/101,576

(22) PCT Filed: Nov. 13, 1997

(86) PCT No.: PCT/FI97/00696

§ 371 Date: Jul. 13, 1998

§ 102(e) Date: Jul. 13, 1998

(87) PCT Pub. No.: WO98/21836

PCT Pub. Date: May 22, 1998

(30) Foreign Application Priority Data

Nov. 14, 1996 (FI) .................................................. 964564

(51) Int. Cl.⁷ .............................. H04B 7/10; H04L 1/02
(52) U.S. Cl. ........................ 375/347; 375/150; 375/152; 375/345; 455/132; 455/134; 455/136
(58) Field of Search ................................ 375/347, 349, 375/350, 345, 148, 152, 229, 230, 233, 150; 455/132, 133, 134, 136

(56) References Cited

U.S. PATENT DOCUMENTS

| | | | | | |
|---|---|---|---|---|---|
| 4,539,710 A | * | 9/1985 | Dinsmore | ................... | 455/134 |
| 5,381,447 A | | 1/1995 | Ayerst et al. | | |
| 5,504,783 A | * | 4/1996 | Tomisato et al. | ........... | 375/267 |
| 5,621,752 A | * | 4/1997 | Antonio et al. | ............. | 375/200 |

FOREIGN PATENT DOCUMENTS

| | | |
|---|---|---|
| EP | 0 557 800 | 9/1993 |
| EP | 0 725 497 | 8/1996 |
| WO | WP 97/04538 | 2/1997 |

* cited by examiner

*Primary Examiner*—Mohammad H. Ghayour
(74) *Attorney, Agent, or Firm*—Altera Law Group, LLC

(57) ABSTRACT

The invention relates to a receiving method and a receive for a radio system. The receiver filters a received signal group propagated on several channels using channel filters (31) to generate separate channel specific signals. These channel specific signals are searched in device (35) for one or more signals (50) stronger than the others. Feed back is performed on these strongest signals (50) and they are subtracted from the received signal group in connector (21) in order to equalize the power levels of the signal group.

12 Claims, 4 Drawing Sheets

RECEIVING METHOD, AND RECEIVER

FIELD OF INVENTION

The invention relates to a receiving method which is used in a radio system comprising at least one subscriber terminal and a base station, which in turn comprise a transmitter and a receiver receiving a signal group comprising signals that have propagated on their own channels and are filtered in the receiver to generate separate channel specific signals.

The invention also relates to a receiver arranged to be used in a radio system comprising a subscriber terminal and a base station, which in turn comprise a transmitter and a receiver arranged to receive a signal group comprising signals propagated on their own channels, and said receiver comprising a channel filter filtering the signal group to generate channel specific signals.

BACKGROUND OF INVENTION

In a typical radio system, such as the GSM (Global System for Mobile Communication), a base station receives a number of subscriber terminal signals of different strengths and transmitted on different channels. Since these signals are the radio system's own signals, they are typically rather narrowband signals with a restricted power. However, especially at the beginning of call set-up when power control is not yet functioning, the subscriber terminal often uses unnecessarily high power, in which case the linear range of operation of signal processing circuits at the base station is exceeded and the signal becomes distorted.

As digital signal processing components develop, an ever increasing number of functions in digital radio systems are performed digitally. A typical example of such a signal processing operation is digital channel filtering of a receiver in the GSM system. The remaining analog signal processing, which includes e.g. amplification, frequency conversion and filtering, is to be performed on the reception band in its entire width. It is also expedient to perform the A/D conversion required on a broad band basis, only in this case a problem arises with the linear range of operation of the A/D converter, which is too narrow as compared with the spreading of the power levels of the received signals, and the subsequent signal distortion. In prior art solutions the dynamic range of the signals is narrowed with logarithm amplifiers. The complexity of logarithm amplifiers, however, causes problems in accuracy and stability. Since the logarithm amplifiers are also expensive, the tendency is to abandon them.

CHARACTERISTICS OF INVENTION

The object of the present invention is thus to provide a method which enables a receiver to operate without logarithm amplifiers, and an A/D conversion to remain linear irrespective of extensive spreading of the power levels of received signals.

The object is achieved with a method described in the preamble, which is characterized in that one or more channel specific signals stronger than the others are searched for, and said channel specific signals stronger than the others are subtracted from a received signal group, in order to equalize the power levels of the signal group, as follows:

the receiver performs at least transfer of the signal group to an intermediate frequency analogously and at least channel filtering digitally, in the channel filtering each signal group being substantially divided into separate channel specific signals of their own, and one or more channel specific signals stronger than the others being D/A converted and subtracted from the intermediate frequency signal group.

A receiver of the invention is characterized in that it comprises means for searching for one or more channel specific signals stronger than the others;

a mixer and a local oscillator arranged to transfer the signal group to the intermediate frequency analogously;

a channel filter arranged to perform the channel filtering digitally, each signal in the signal group being substantially separated as a channel specific signal on a channel of its own;

a D/A converter arranged to D/A convert one or more channel specific signals stronger than the others, and a connector arranged to subtract one or more D/A converted channel specific signals stronger than the others from the intermediate frequency signal group, in order to equalize the power levels of the signal group.

The method of the invention provides considerable advantages. Expensive, complex and relatively unstable and inaccurate logarithm amplifiers can be abandoned, without impairing the linearity of the A/D conversion.

DESCRIPTION OF DRAWINGS

In the following the invention will be described in more detail, with reference to the examples illustrated in the attached drawings in which.

DESCRIPTION OF PREFERRED EMBODIMENTS

Figure 1:
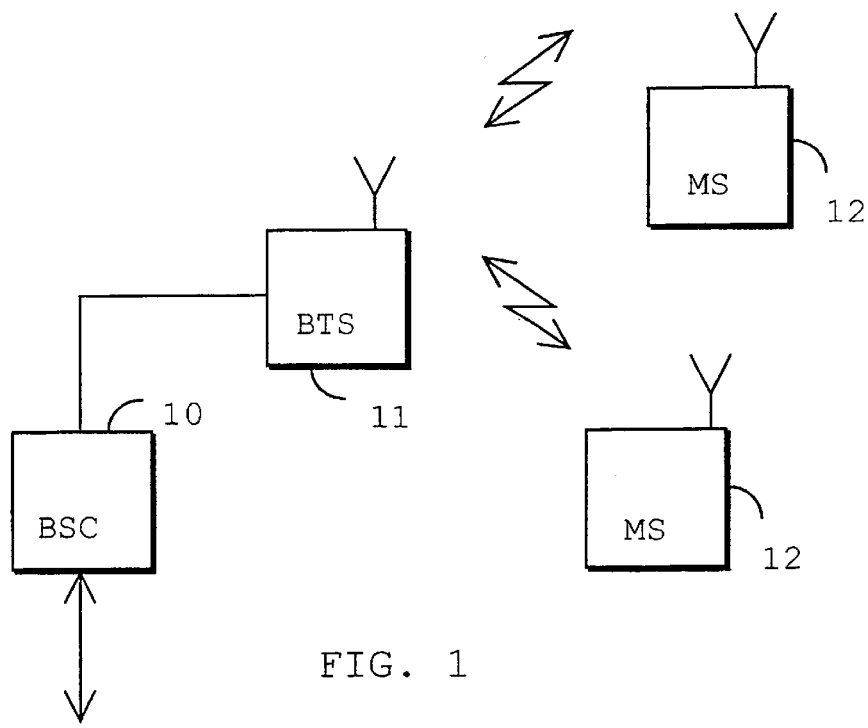
FIG. 1 illustrates a radio system.

A solution of the invention is particularly suitable for, although not restricted to, GSM and DCS 1800 (Digital Cellular System) radio systems. FIG. 1 is a block diagram illustrating a radio system comprising base station controller 10, base station 11 and subscribers terminals 12. Each subscriber terminal 12 and base station 11 comprise a transceiver. Base station controller 10, which is connected with the other parts of the network, and base station 11 communicate with each other via a digital link. Subscriber terminals 12, which are preferably mobile stations, have a bi-directional interface with base station 11. Base station 11 and the subscriber terminal receive a signal group comprising signals propagated on several different channels from different transceivers. The power level distribution of the received signal group is large due to e.g. the distance between the transmitter and the receiver.

Let us now study the method of the invention in more detail. The inventive solution is particularly well suited for use at a base station of the radio system. The dynamic range of a prior art receiver is determined by an A/D converter. The object of the method is to make the receiver, and the A/D converter in particular, less dependent on the dynamic range of the received signals. This is achieved by narrowing the dynamic range of the received signals, which is achieved by attenuating strong, narrowband signals before the A/D conversion. Strong signals can be preferably attenuated by adding to them a signal similar to the signals themselves in an inverse-phase form. This is most preferably done by performing negative feedback.

Figure 2:
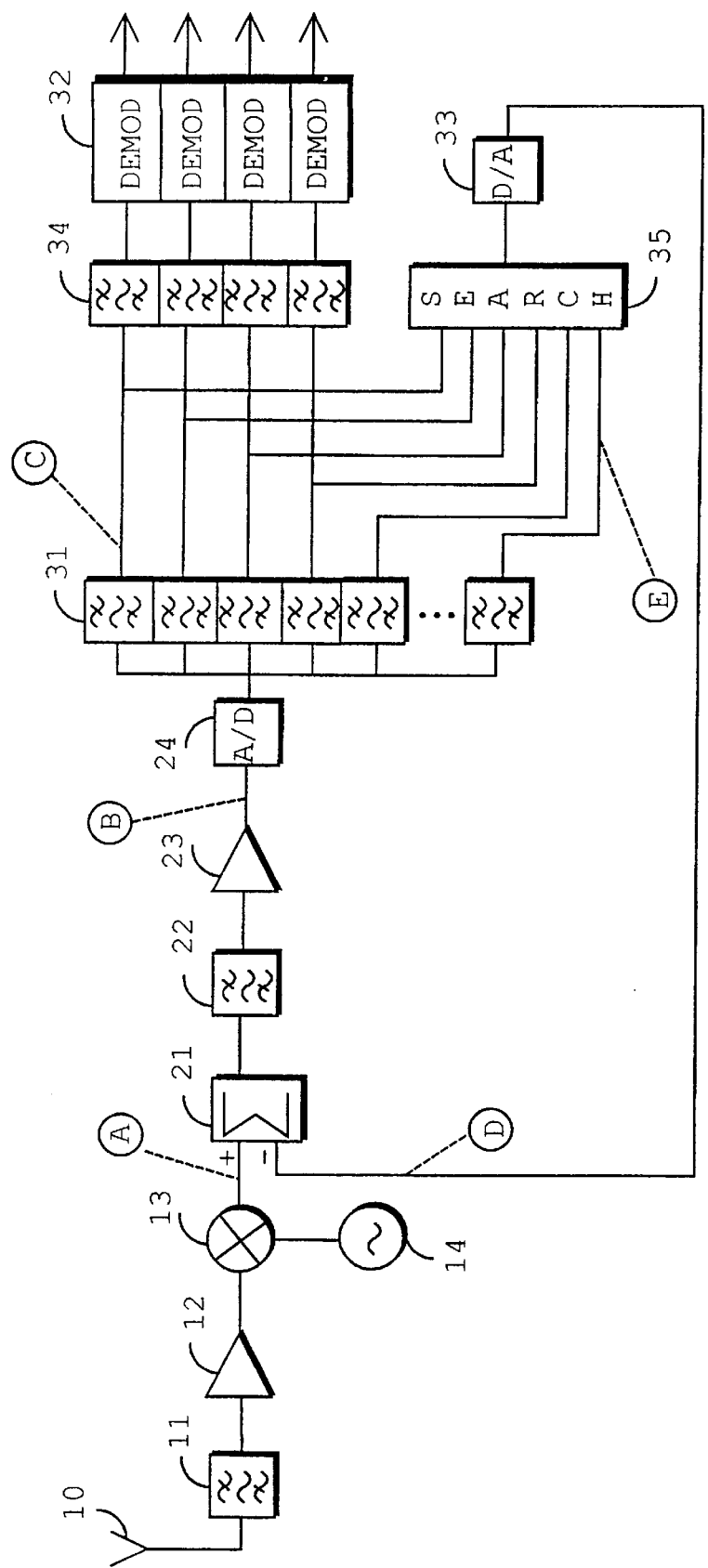
FIG. 2 illustrates a block diagram of a receiver.
Figure 3:
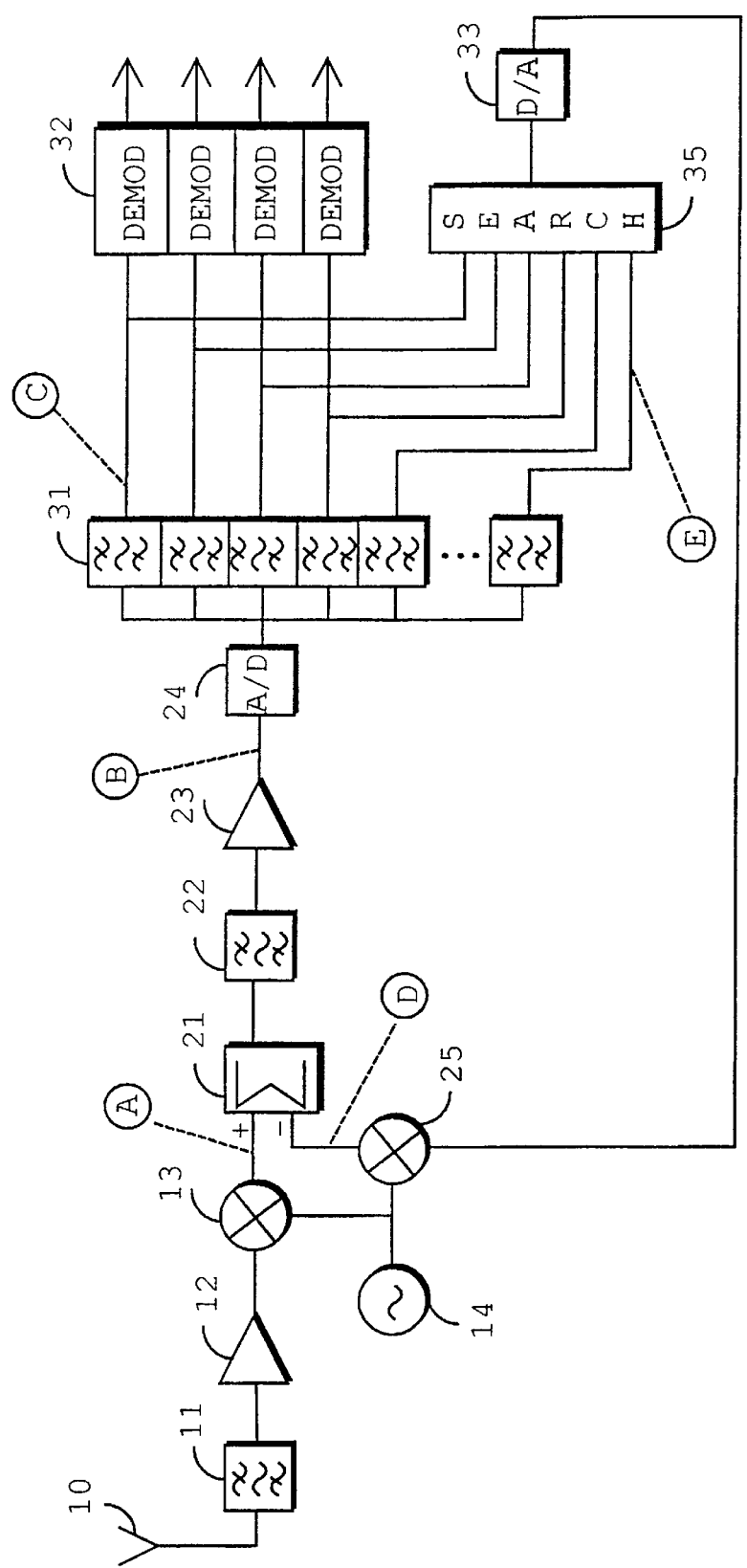
FIG. 3 illustrates a block diagram of a receiver.
Figure 4:
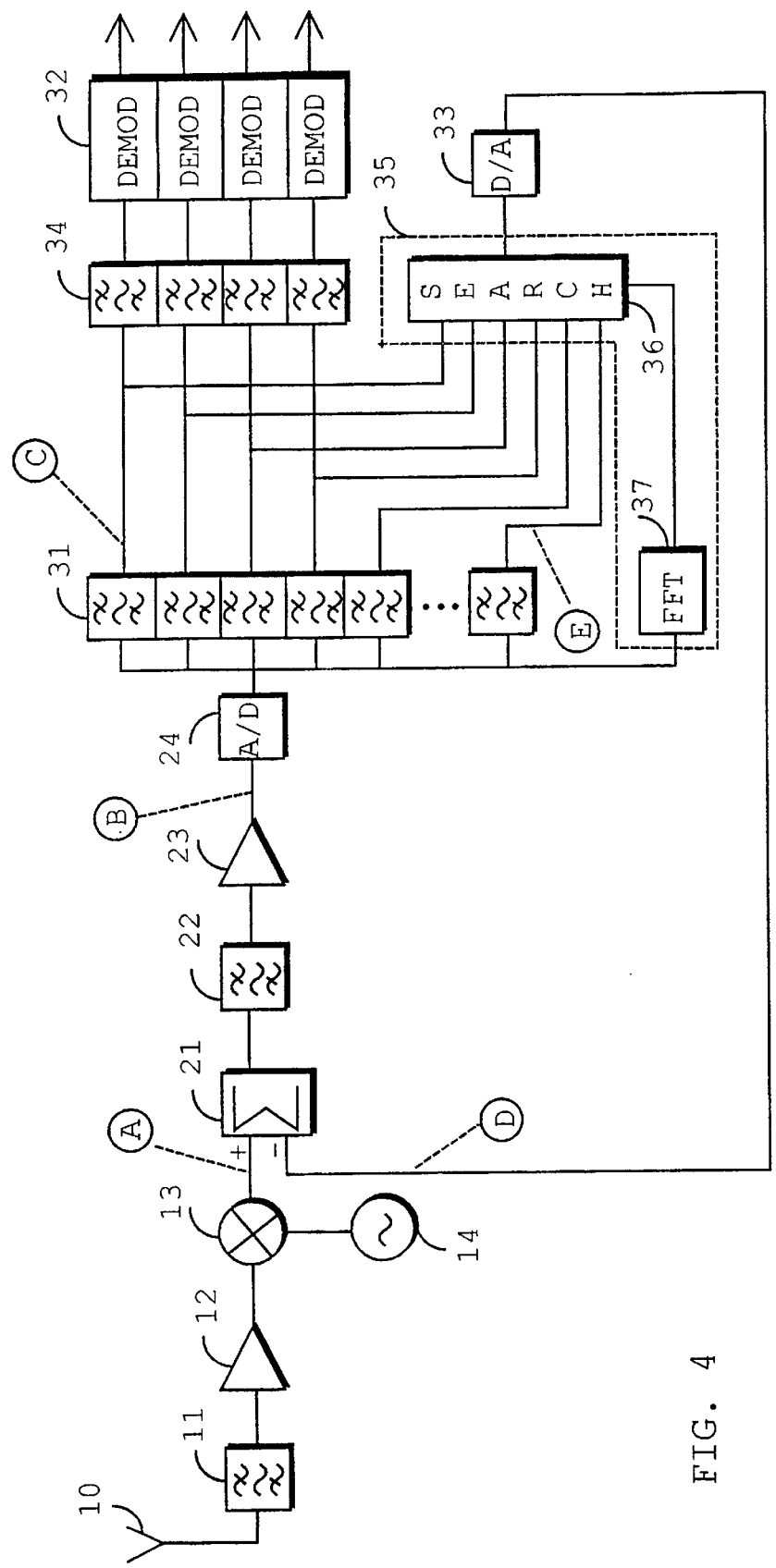
FIG. 4 illustrates a block diagram of a receiver.

A method and different receiver solutions of the invention are now studied in more detail with reference to FIGS. 2–4. The receiver in FIG. 2 comprises antenna 10, RX filter 11, low noise amplifier 12, mixer 13, local oscillator 14, connector 21, passband filter 22, amplifier 23, A/D converter 24, first digital channel filters 31, demodulators 32, D/A converter, second digital channel filters 34 and means 35 for searching for channel specific signals stronger than the others. The receiver functions as follows. A signal group received proceeds from antenna 10 to RX filter 11 which passband filters the signal group. Low noise amplifier 12 then amplifies the high-frequency signal group, which is transferred to an intermediate frequency by multiplying the signal group in multiplier 13 by the frequency of local oscillator 14. The distorting peaks of the strongest signals are subtracted in connector 21 from the intermediate frequency signal group. The signal group is then passband filtered in order to abolish interference and harmonic signals typically caused by signals outside the desired frequency band, and by mixer 13 and connector 21. The filtered signal group is amplified in amplifier 23 and digitized in A/D converter 24. The digital signal group is filtered in filters 31 to generate separate channel specific signals. In this embodiment shown in FIG. 2, means 35 search these channel specific signals for one or more of the strongest signals, which is/are converted back to an analog form in D/A converter 33. The means search for the strongest signal or signals by comparing the strengths of the channel specific signals with each other. Signal strength is preferably measured as power. The D/A converted analog signal or signals is/are fed back to connector 21, which subtracts it/them from the received signal group. In connection with the D/A conversion, the feedback or the subtraction performed in connector 21 the strength of the feedback signals is preferably scaled in such a way that the strengths of the signals of the signal group propagated on different channels are equalized and their dynamic range becomes smaller. In this inventive solution the D/A converter is rapid. The operating frequency is typically 175 MHz, for which reason the D/A converter converts the received signal or signals directly to an intermediate frequency and the signal or signals can be subtracted directly from the intermediate frequency signal group. First channel filters 31 typically perform rough channel filtering, and more accurate channel filtering is performed in second channel filters 34. Channel filtering can be performed either by software or by using fixed combination and sequential logic. The number of channel filterings performed is not, however, significant to the invention. The purity or resolution of channel filtering 31 is not critical, either. The only important aspect is to perform at least one channel filtering separating the channels used. After the channel filtering the signals are demodulated in demodulator 32 and further processed in processes that are not essential to the invention.

FIG. 3 shows a receiver structure which is similar to the one in FIG. 2 except that this solution uses a lower frequency D/A converter 33 with an operating frequency of e.g. about 10 MHz. For this reason the signal or signals converted to an analog form is/are multiplied in multiplier 25 by the frequency of local oscillator 14 to the intermediate frequency. Otherwise the receiver solution shown in FIG. 3 functions in the same way as the one in FIG. 2.

FIG. 4 also shows a receiver which differs only slightly from the above solutions. In this solution the strongest channel signals are searched for at the frequency level. Means 35, which search the strongest channel specific signals, preferably comprise Fourier transform means 37 and means 36 for selecting the strongest frequencies, i.e. in this case signals from the channels separated according to frequency. The Fourier transform means preferably perform fast Fourier transform FFT. In its general form, the Fourier transform is calculated as an integral as follows:

$$\mathcal{F}\{f(t)\} = F(\omega) = \frac{1}{\sqrt{2\pi}} \int_{-\infty}^{\infty} f(t)e^{-i\omega t} dt,$$

in which $\mathcal{F}$ represents the Fourier transform, f(t) is a function of time t, $F(\omega)$ is a Fourier transformed function, $\omega$ is a frequency variable, i is an imaginary unit and $\pi$ represents the number pi. In a digital system, the Fourier transform integral is calculated by means of a summation in which N terms to be summed are included. The number of operations in FFT has been, however, considerably reduced. The Fourier transform typically requires $N^2$ operations, but FFT can preferably be performed with $N*\log_2(N)$ operations (the Danielson-Lanczos theorem).

On the basis of the Fourier transform, means 36 search the signal group converted to the frequency domain for at least one frequency with higher signal strength than the others. Means 36 then select a channel specific signal corresponding to said frequency for subtraction from the signal group. If there are several too strong frequencies and distortion caused by them is to be avoided, the channel specific signals corresponding to these frequencies are selected in means 36 for subtraction from the signal group.

Figure 5:
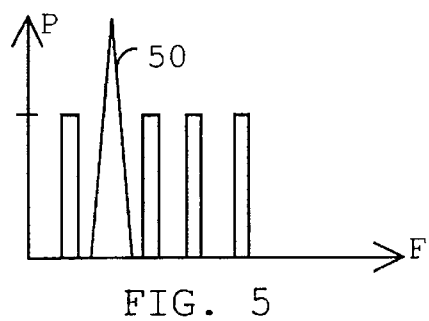
FIG. 5 illustrates a signal at point A.

FIGS. 5–9 clarify the operation of the invention. FIG. 5 illustrates a signal group at point A of FIGS. 2–4. The vertical axis shows the effective value of a signal strength, measured e.g. in decibels (dBm). The horizontal axis represents frequency. In this example a signal group comprises five signals that have propagated on different channels and of which signal 50, due to its strength, causes distortion in the A/D converter.

Figure 6:
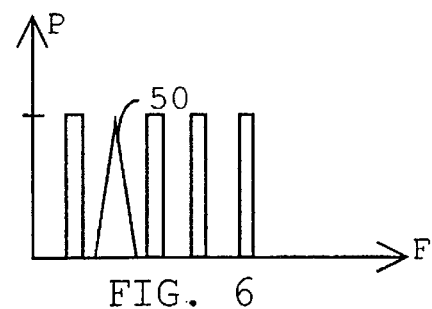
FIG. 6 illustrates a signal at point B.

FIG. 6 illustrates the same signal group at point B of FIGS. 2–4. The effect of the strongest signal in the signal group has been reduced and all five signals are now equally strong, i.e. they are preferably approximately of the same power level and signal distortion does not occur anymore.

Figure 7:
FIG. 7 illustrates a signal at point C.

FIG. 7 illustrates point C of FIGS. 2–4, showing one channel filtered signal from the signal group. Channel filtering 31 has eliminated other signals of the signal group. Each channel is filtered similarly.

Figure 8:
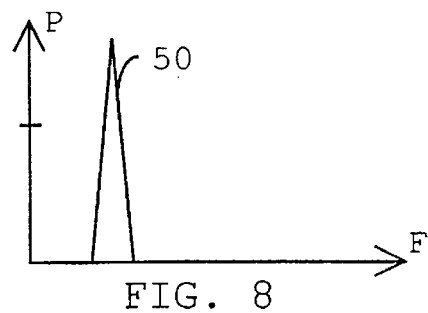
FIG. 8 illustrates a signal at point D and FIG. 9 illustrates a signal at point E.

FIG. 8 shows the strongest channel specific signal 50 which causes distortion and is propagating to connector 21 for subtraction from the signal group at point D of FIGS. 2–4. This channel signal 50 is preferably scaled in such a way that the power distribution of the signal group is equalized as shown in FIG. 6.

Figure 9:
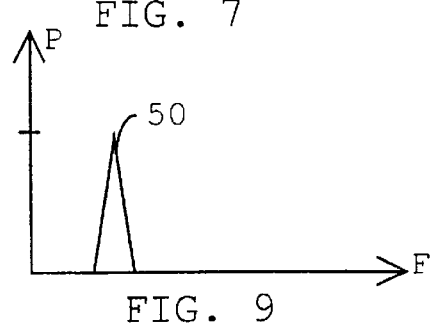

FIG. 9 shows the strongest channel signal 50 of point E of FIGS. 2–4, the signal having just been selected for subtraction from the signal group.

The solutions of the invention can be implemented, particularly as regards digital signal processing, with e.g. ASIC and VLSI circuits, and the digital operations to be performed are preferably implemented as programs based on microprocessor technology.

Although the invention is described above with reference to an example illustrated in the attached drawings, it is apparent that the invention is not restricted to it, but it can vary in several different ways within the inventive idea presented in the enclosed claims.

What is claimed is:

1. Receiving method which is used in a radio system comprising at least one subscriber terminal (12) and a base station (11), which in turn comprise a transmitter and a receiver receiving a signal group comprising signals that have propagated on their own channels and are filtered in the receiver to generate separate channel specific signals, characterized in that one or more channel specific signals (50) stronger than the others are searched for, and said channel specific signals (50) stronger than the others are subtracted from the received signal group, in order to equalize the power levels of the signal group, as follows:

the receiver performs at least transfer of the signal group to an intermediate frequency analogously and at least channel filtering digitally, in the channel filtering each signal group being substantially divided into separate channel specific signals of their own, and said one or more channel specific signals (50) stronger than the others being D/A converted and subtracted from the signal group of the intermediate frequency.

2. Method according to claim 1, characterized in that, as the receiver transfers the received signal group to the intermediate frequency, said one or more signals (50) stronger than the others are subtracted from the intermediate frequency signal group.

3. Method according to claim 1, characterized in that, before said one or more channel specific signals (50) stronger than the others are subtracted from the intermediate frequency signal group, they are converted to the same intermediate frequency as the received signal group by multiplying said channel specific signal by a local oscillator (14) frequency.

4. Method according to claim 1, characterized in that said one or more channel specific signals (50) stronger than the others are searched for without channel filtering by applying a transform to convert the intermediate frequency signal group to a frequency domain, searching the signal group converted to the frequency domain for at least one frequency in which the signal strength is stronger than in the others, and selecting said channel specific signal (50) that is stronger than the others and corresponds to said frequency for subtraction from the signal group.

5. Method according to claim 1, characterized in that said one or more channel specific signals (50) stronger than the others are searched for by comparing the strengths of the channel filtered channel specific signals with each other and selecting at least one signal (50) that is stronger than the others for subtraction from the signal group.

6. Method according to claim 1, characterized in that said channel specific signal (50) is subtracted from the signal group by reversing the phase of the channel specific signal (50) and by summing the inverse-phased signal thus generated to the signal group.

7. Receiver arranged to be used in a radio system comprising a subscriber terminal (12) and a base station (11) which in turn comprise a transmitter and a receiver arranged to receive a signal group comprising signals propagated on their own channels, and said receiver comprising a channel filter (31) filtering the signal group to generate channel specific signals, characterized in that the receiver comprises means (35) for searching for one or more channel specific signals (50) stronger than the others;

a mixer (13) and a local oscillator (14) arranged to transfer the signal group analogously to an intermediate frequency;

a channel filter (31) arranged to perform the channel filtering digitally, each signal in the signal group being substantially-separated as a channel specific signal on a channel of its own;

a D/A converter arranged to D/A convert one or more channel specific signals (50) stronger than the others, and a connector (21) arranged to subtract one or more D/A converted channel specific signals (50) stronger than the others from the intermediate frequency signal group, in order to equalize the power levels of the signal group.

8. Receiver according to claim 7, characterized in that, as the receiver comprises a mixer (13) and a local oscillator (14) for transferring the received signal group to the intermediate frequency, a connector (21) is arranged to subtract said one or more signal (50) stronger than the others from the intermediate frequency signal group.

9. Receiver according to claim 7, characterized in that the receiver is arranged to multiply the D/A converted channel specific signal (50) by the frequency of the local oscillator (14) to generate an intermediate frequency signal, before said channel specific signal (50) is subtracted from the received signal group in the connector (21).

10. Receiver according to claim 7, characterized in that the means (35) for searching for one or more channel specific signals (50) stronger than the others are arranged to convert the intermediate frequency signal group to a frequency domain by applying a transform, to search the signal group converted to the frequency domain for at least one frequency with a stronger signal strength than the others, and to select a channel specific signal (50) corresponding to said frequency for subtraction from the signal group.

11. Receiver according to claim 7, characterized in that the means (35) are arranged to compare the strengths of the channel filtered channel specific signals with each other and to select at least one signal (50) that is stronger than the others for subtraction from the signal group.

12. Receiver according to claim 7, characterized in that the connector (21) is arranged to sum said inverse-phased, channel specific one or more signals (50) stronger than the others to the signal group.

* * * * *